(12) United States Patent
Silverstein et al.

(10) Patent No.: US 11,831,709 B1
(45) Date of Patent: Nov. 28, 2023

(54) FACILITATING PEER-TO-PEER CLOUD COMPUTING RESOURCE SHARING UTILIZING A PERMISSIONED DISTRIBUTED LEDGER

(71) Applicant: International Business Machines Corporation, Armonk, NY (US)

(72) Inventors: Zachary A. Silverstein, Georgetown, TX (US); Melanie Dauber, Oceanside, NY (US); Jacob Ryan Jepperson, St. Paul, MN (US); Jeremy R. Fox, Georgetown, TX (US); Logan Bailey, Atlanta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/062,865

(22) Filed: Dec. 7, 2022

(51) Int. Cl.
*G06Q 20/22* (2012.01)
*H04L 67/1074* (2022.01)

(52) U.S. Cl.
CPC ....... *H04L 67/1076* (2013.01); *G06Q 20/223* (2013.01)

(58) Field of Classification Search
CPC .................. H04L 67/1076; G06Q 20/223
See application file for complete search history.

(56) References Cited

U.S. PATENT DOCUMENTS

| | | | |
|---|---|---|---|
| 10,785,167 B2 | 9/2020 | Karame et al. | |
| 11,063,745 B1 | 7/2021 | Du et al. | |

(Continued)

FOREIGN PATENT DOCUMENTS

| | | |
|---|---|---|
| CN | 108985937 A | 12/2018 |
| CN | 109886659 A | 6/2019 |

(Continued)

OTHER PUBLICATIONS

Zafari et al., "Let's Share: A Game—Theoretic Framework for Resource Sharing in Mobile Edge Clouds," IEEE Transactions on Network and Service Management, vol. 18, No. 2, Jun. 2021, 16 pages.

(Continued)

*Primary Examiner* — Aftab N. Khan
(74) *Attorney, Agent, or Firm* — Yee & Associates, P.C.

(57) ABSTRACT

Facilitating peer-to-peer cloud computing resource sharing utilizing a permissioned distributed ledger is provided. A request by a computational resource consumer for additional computational resources from a computational resource provider via a peer-to-peer decentralized network is detected. A computational resource exchange environment is generated to transfer the additional computational resources from the computational resource provider to the computational resource consumer in response to validating that the computational resource consumer is authorized to consume the additional computational resources and that the computational resource provider is authorized to transfer the additional computational resources to the computational resource consumer via the peer-to-peer decentralized network. The additional computational resources are transferred from the computational resource provider to the computational resource consumer for consumption via the computational resource exchange environment. The additional computational resources provided by the computational resource provider and the consumption of the additional computational resources by the computational resource consumer are anonymized.

20 Claims, 4 Drawing Sheets

(56) References Cited

U.S. PATENT DOCUMENTS

| | | | |
|---|---|---|---|
| 11,128,437 B1* | 9/2021 | Nossik | H04L 9/0637 |
| 11,687,700 B1* | 6/2023 | Pfitzmann | G06V 30/412 |
| | | | 715/234 |
| 2017/0330159 A1 | 11/2017 | Castinado et al. | |
| 2019/0228409 A1 | 7/2019 | Madisetti et al. | |
| 2019/0319861 A1 | 10/2019 | Pan et al. | |
| 2019/0334726 A1* | 10/2019 | Kelly | H04L 9/3247 |
| 2021/0081404 A1* | 3/2021 | Kempf | H04L 9/0637 |
| 2021/0250353 A1* | 8/2021 | Todd | H04L 63/108 |
| 2022/0261804 A1* | 8/2022 | Concannon | H04L 9/0637 |

FOREIGN PATENT DOCUMENTS

| | | |
|---|---|---|
| CN | 110362409 A | 10/2019 |
| CN | 111209111 A | 5/2020 |
| KR | 102107115 B1 | 5/2020 |
| WO | 2020248603 A1 | 12/2020 |

OTHER PUBLICATIONS

Lin, et al., "Dynamic Auction Mechanism for Cloud Resource Allocation," 2010 10th IEEE/ACM International Conference on Cluster, Cloud and Grid Computing, Melbourne, Victoria, Australia, May 17-20, 2010, 2 pages.

"The Web3 Marketplace," iExec, https://iex.ec/, accessed onOct. 24, 2022, 6 pages. https://iex.ec/.

"IBM Cloud Hybrid. Open. Resilient.," IBM Corporation, accessed Oct. 24, 2022, 10 pages. https://www.ibm.com/cloud.

Zhang, "iExec Integrates IBM Cloud to Increase the Security of Decentralized Computing," Nov. 16, 2018, accessed Oct. 24, 2022, 7 pages. https://www.ibm.com/cloud/blog/iexec-integrates-ibm-cloud-to-increase-the-security-of-decentralized-computing#:~:text=iExec%20and%20IBM%20Cloud%20are,computing%20resources%20and%20application%20deployment.

"Compute services on IBM Cloud," IBM Corporation, accessed Dec. 24, 2022, 10 pages. https://www.ibm.com/cloud/compute.

"Cloud Infrastructure Solutions," IBM Corporation, access Oct. 23, 2022, 8 pages. https://www.ibm.com/cloud/infrastructure.

"Helping companies trade seamlessly," IBM Blockchain facilitates international commerce, IBM Blockchain, Copyright IBM Corporation 2021, Aug. 2021, 11 pages https://www.ibm.com/downloads/cas/GPD2LQVV.

Zafari et al., "A Game—Theoretic Framework for Resource Sharing in Clouds," 2019 12th IFIP Wireless and Mobile Networking Conference (WMNC), Paris, France, Sep. 11-13, 2019, 10 pages. arXiv:1904.00820v1 [cs.MA] Apr. 1, 2019.

"Blockchain-Based Decentralized Cloud Computing," iExec, Whitepaper, Version 3.0, 2017-2018, 40 pages. https://iex.ec/wp-content/uploads/2022/09/iexec_whitepaper.pdf.

\* cited by examiner

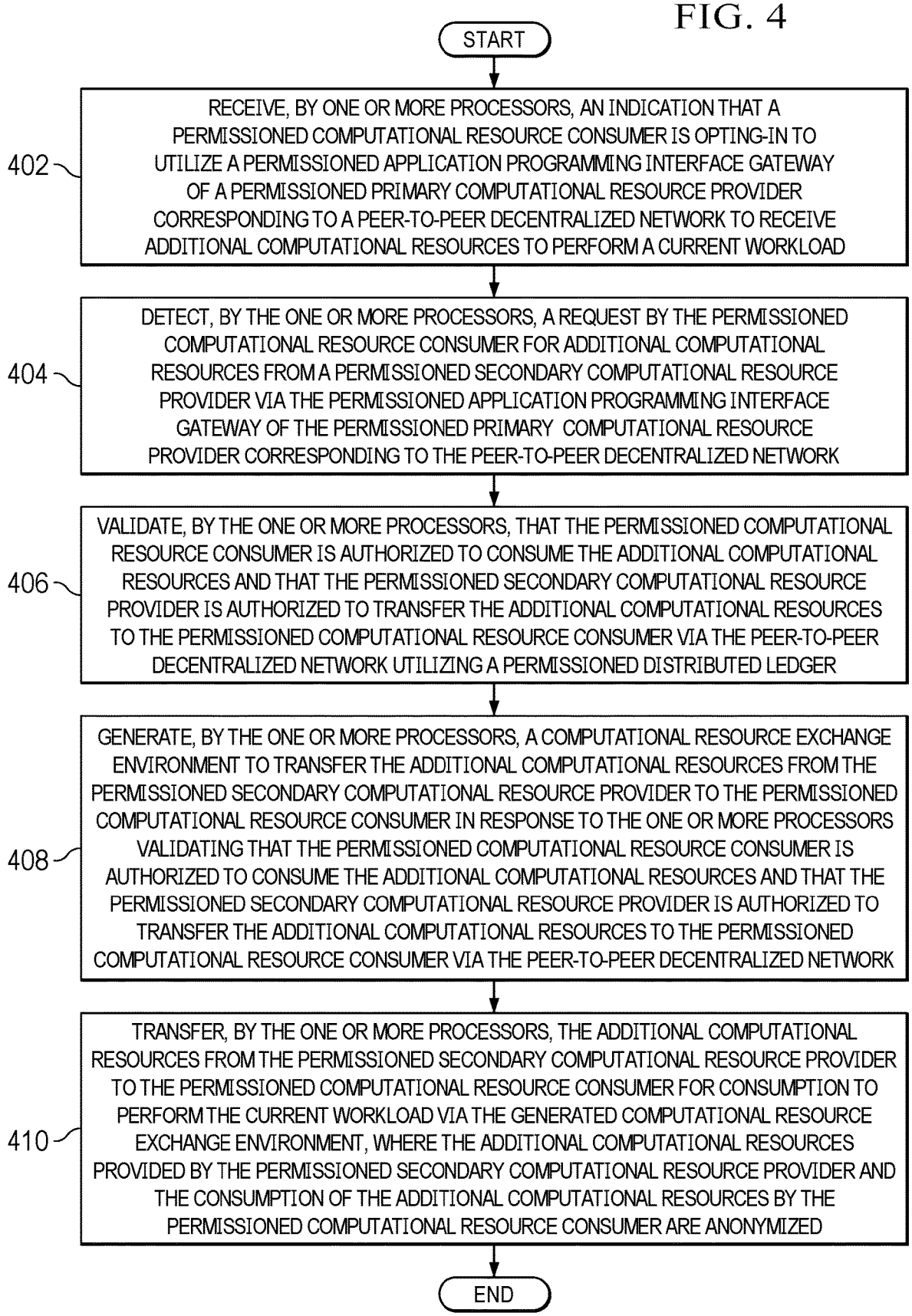

FACILITATING PEER-TO-PEER CLOUD COMPUTING RESOURCE SHARING UTILIZING A PERMISSIONED DISTRIBUTED LEDGER

BACKGROUND

1. Field

The disclosure relates generally to cloud computing and more specifically to facilitating peer-to-peer cloud computing resource sharing utilizing a permissioned distributed ledger.

2. Description of the Related Art

Cloud computing is on-demand availability of computer system resources (e.g., computing power, data storage, and the like), without direct active management by a subscribing user. Cloud environments often have functionalities distributed over multiple computer systems and locations. A cloud service provider manages these computer system resources and makes these resources available for a subscription fee or bills according to resource usage.

SUMMARY

According to one illustrative embodiment, a computer-implemented method for facilitating peer-to-peer cloud computing resource sharing utilizing a permissioned distributed ledger is provided. One or more processors detect a request by a computational resource consumer for additional computational resources from a computational resource provider via a peer-to-peer decentralized network. The one or more processors generate a computational resource exchange environment to transfer the additional computational resources from the computational resource provider to the computational resource consumer in response to the one or more processors validating that the computational resource consumer is authorized to consume the additional computational resources and that the computational resource provider is authorized to transfer the additional computational resources to the computational resource consumer via the peer-to-peer decentralized network. The one or more processors transfer the additional computational resources from the computational resource provider to the computational resource consumer for consumption via the computational resource exchange environment. The additional computational resources provided by the computational resource provider and the consumption of the additional computational resources by the computational resource consumer are anonymized. According to other illustrative embodiments, a computer system and computer program product for facilitating peer-to-peer cloud computing resource sharing utilizing a permissioned distributed ledger are provided.

BRIEF DESCRIPTION OF THE DRAWINGS

FIG. 4 is a flowchart illustrating a process for peer-to-peer computational resource sharing using a permissioned distributed ledger in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
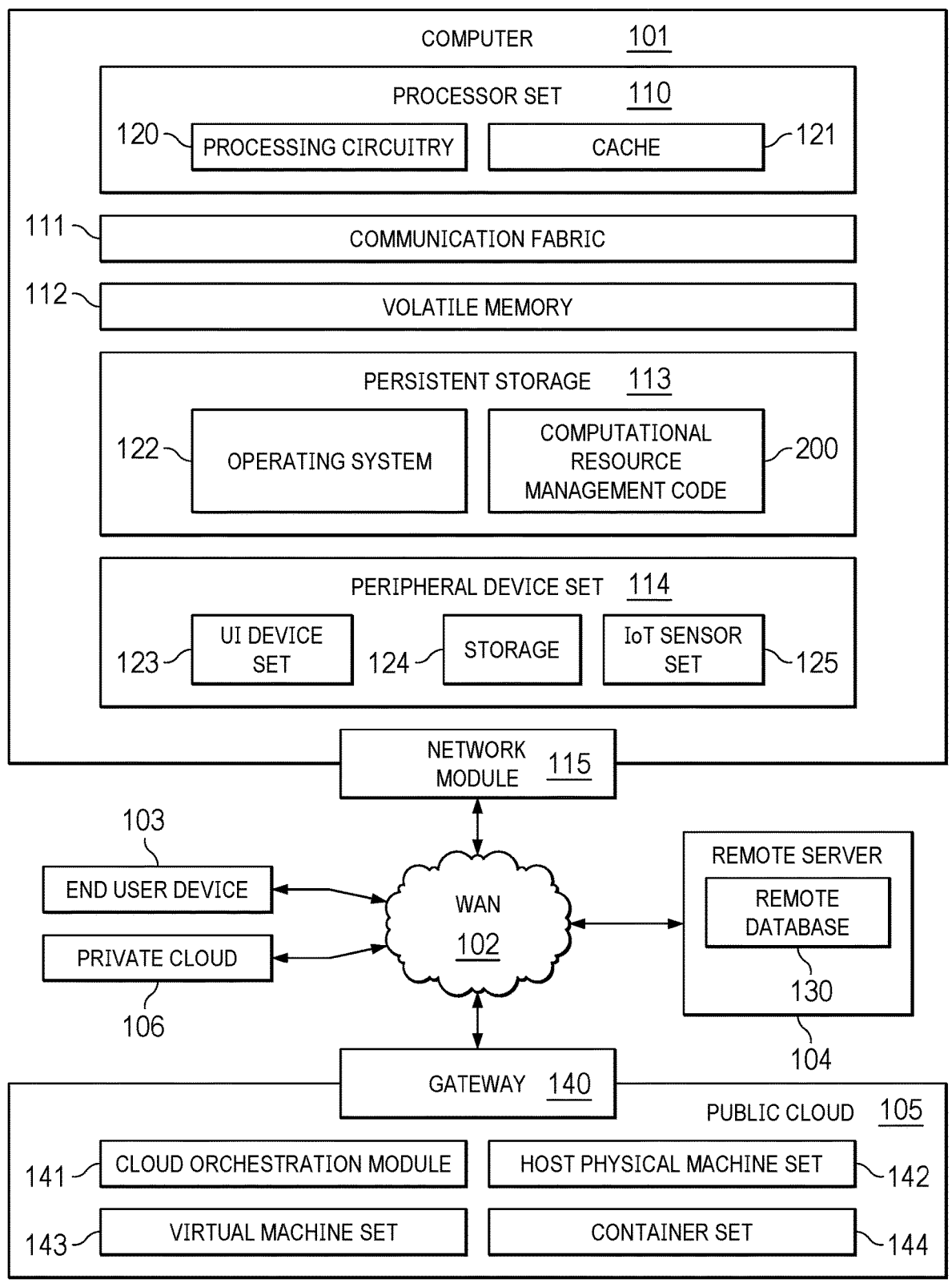
FIG. 1 is a pictorial representation of a computing environment in which illustrative embodiments may be implemented.
Figure 2:
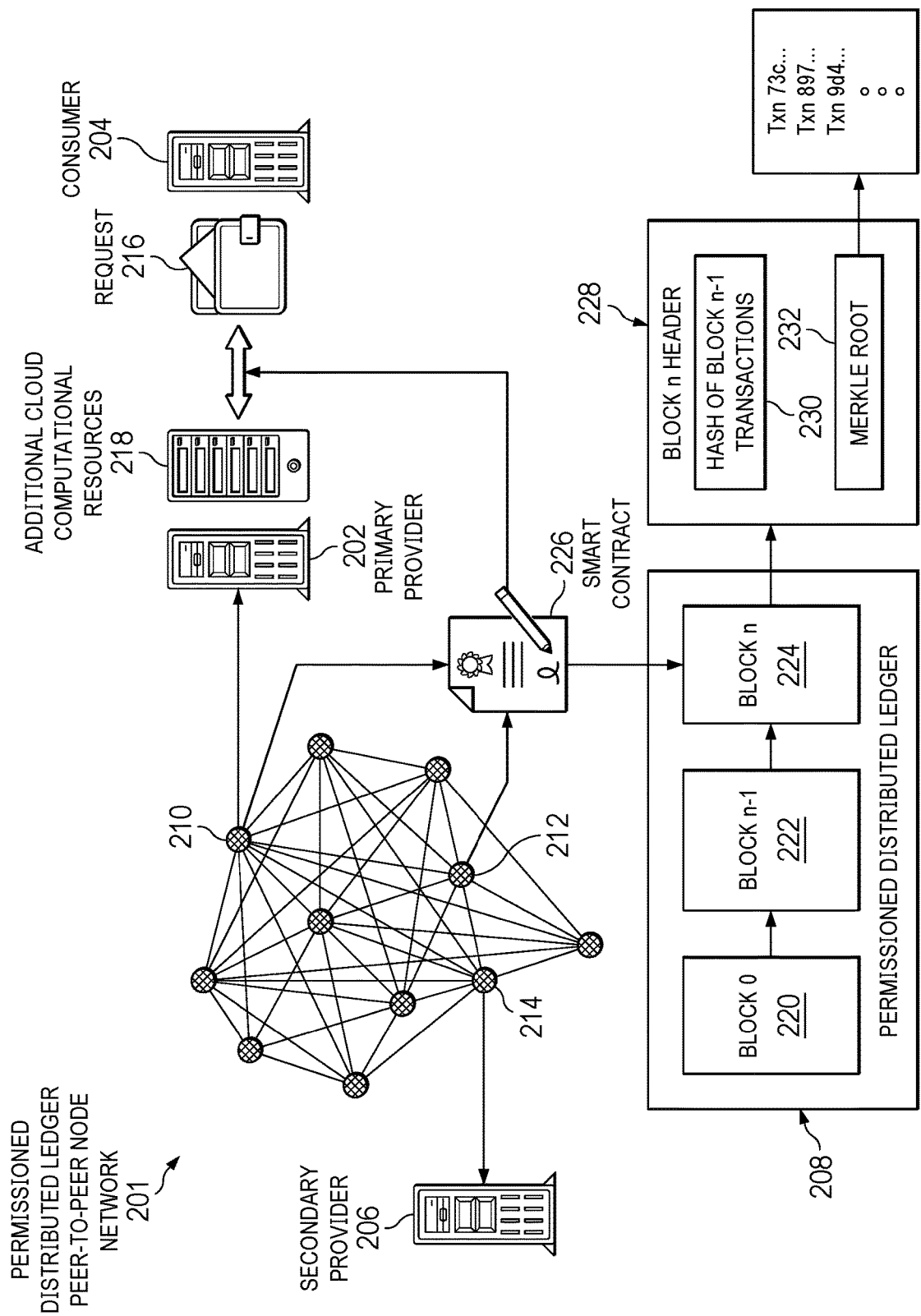
FIG. 2 is a diagram illustrating an example of a permissioned distributed ledger peer-to-peer node network in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as computational resource management code 200. For example, computational resource management code 200 provides a permissioned distributed ledger-based system to facilitate the sharing or exchange of cloud computational resources in a peer-to-peer decentralized network of permissioned or authorized peers, users, participants, or members. The permissioned distributed ledger-based system accommodates discovery of available computational resources for sharing within the peer-to-peer decentralized network. It should be noted that a peer in the peer-to-peer decentralized network can be a provider of cloud computational resources or a consumer of cloud computational resources. Cloud computational resources can include, for example, processing, memory, storage, network, and the like.

In addition to computational resource management code block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and computational resource management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in computational resource management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The computational resource management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a customer of an entity that operates computer 101), and may take any of the forms discussed above in connection with computer 101. EUD 103 typically receives helpful and useful data from the operations of computer 101. For example, in a hypothetical case where computer 101 is designed to provide a computational resource sharing recommendation to an end user, this recommendation would typically be communicated from network module 115 of computer 101 through WAN 102 to EUD 103. In this way, EUD 103 can display, or otherwise present, the computational resource sharing recommendation to the end user. In some embodiments, EUD 103 may be a client device, such as thin client, heavy client, mainframe computer, desktop computer, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a computational resource sharing recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially computing power and data storage (cloud storage), without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Inefficiencies hindering optimal allocation of cloud computing resources persist and will likely be exacerbated by increasing demand caused by further proliferation of cloud computing. For example, cloud computing resource provisioning based on Service Level Agreements can create inefficiencies in, for example, resource availability, resource elasticity, and the like in the overall cloud environment. Both consumers and providers of cloud computing resources encounter trade-offs between performance and elasticity in current cloud computing resource allocation solutions. As a result, a novel solution is needed to enable consumers to both consume and share their allocated cloud-based computational resources without interacting with secondary cloud computing resource providers when a particular consumer needs more or fewer cloud computing resources from a primary cloud computing resource provider at any given point in time.

Illustrative embodiments facilitate peer-to-peer cloud computing resource sharing utilizing a permissioned distributed ledger to accommodate consumers with elastic cloud computing resource needs. By utilizing a permissioned distributed ledger, illustrative embodiments enable a peer-to-peer decentralized network of cooperative computational resource sharing peers to interact in either a primary or secondary peer-to-peer network of cloud computing resources without dependence on a centralized transactional authority. Thus, illustrative embodiments enable consumers to adjust their computational resource needs by rapidly scaling up their allocated computational resources or rapidly scaling down their allocated computational resources in real time.

Illustrative embodiments utilize the permissioned distributed ledger, such as, for example, a permissioned blockchain, to facilitate the allocation of computational resources between cloud computational resource providers and consumers in a decentralized manner. A permissioned application programming interface (API) gateway of a primary computational resource provider accesses the permissioned distributed ledger to securely authenticate and distribute workloads. For example, a primary computational resource provider can function as an endpoint that computational resource consumers can either subscribe to and consume allocated computational resources or subscribe to and share their allocated computational resources with other consumers as a secondary provider on the peer-to-peer decentralized network using the permissioned distributed ledger.

Illustrative embodiments allow permissioned users (i.e., consumers) to access data, which identify computational resource capacity and availability of providers, in the permissioned distributed ledger to secure computational workspaces. In response to a permissioned consumer requesting additional computational resources in a Software-as-a-Service manner from a secondary provider, the primary provider can ad-hoc grant access to the consumer by the secondary provider. Illustrative embodiments leverage the permissioned distributed ledger to facilitate a tokenized representation of metered units of a computational resource (e.g., processing, bandwidth, storage, memory, or the like). The permissioned distributed ledger enables permissioned users to dynamically share computational resources or tokenized representations of computational resources among the peer-to-peer decentralized network based on real time need to correct over-provisioning or under-provisioning of computational resources by consumers.

As an exemplary use case scenario, a permissioned user is a program developer at Acme Bank. The permissioned user utilizes cloud computing resources to host applications developed by the permissioned user (i.e., the program developer). The permissioned user currently receives cloud computational resources from a primary provider, such as, for example, IBM Cloud® (a registered trademark of International Business Machines Corporation of Armonk, New York, U.S.A.). Typically, the permissioned user is capable of estimating the computational resource needs in order to correctly license and scope service level agreements with the primary provider. However, occasionally the permissioned user overestimations or underestimates actual computational resource usage.

For example, the permissioned user (i.e., the program developer) knows in real time that the permissioned user has underestimated the number of computational resources needed to complete a current application project. As a result, the permissioned user opts-in to utilize the permissioned API gateway of the primary computational resource provider to find available computational resources of one or more secondary computational resource providers. The permissioned API gateway detects that the permissioned user has accessed the permissioned API gateway to find additional computational resources and validates that the permissioned user is a current customer of the primary provider with an existing smart contract in place for computational resources, as well as partnerships, providers, and the like.

The permissioned API gateway generates a computational resource exchange environment for transferring computational resources to the permissioned user (i.e., the computational resource consumer) by spinning up a set of additional nodes (e.g., virtual machines). It should be noted that another provider can provision the set of additional nodes. The permissioned API gateway also automatically detects and selects the optimal secondary provider (e.g., ABC Bank) to provide the additional computational resources to complete the current application project for this exemplary use case scenario based on the permissioned user's existing smart contract and the additional computational resources needed to complete the current application project that are within close geographic proximity to the permissioned user to reduce network latency. It should be noted that the permissioned user is not aware that the permissioned API gateway is utilizing the computational resources of ABC Bank to complete the permissioned user's current application project so there is no compromise of data security.

Illustrative embodiments can also provide locally targeted geographical infusion and personalization. For example, when a group of permissioned users of a particular cloud service need to be located within one geographic area, illustrative embodiments can utilize a cloud service geolocation identification approach that is optimized for a set of use cases which the business application owner prefers. This cloud service geolocation identification approach enables hyper-localization. Hyper-localization generates content based on specific data (e.g., down to the local city level), identifying how users are searching and consuming. Illustrative embodiments utilize hyper-localization to provide an additional layer of personalization for a cloud service, which in this case is the secondary provider market for computational resources. Illustrative embodiments utilize hyper-localization to produce a highly tailored approach for local permissioned users and business application owners. Illustrative embodiments enable targeted exact recommendations for each permissioned user's specific computational resource needs utilizing hyper-localization. Illustrative embodiments enable this hyper-localization using a knowledge corpus of historical computational resource usage per geolocation, consumer, type of cloud service requested, and the like.

Thus, illustrative embodiments provide one or more technical solutions that overcome a technical problem with securely sharing cloud computing resources between resource providers and resource consumers. As a result, these one or more technical solutions provide a technical effect and practical application in the field of cloud computing.

With reference now to FIG. 2, a diagram illustrating an example of a permissioned distributed ledger peer-to-peer node network is depicted in accordance with an illustrative embodiment. Permissioned distributed ledger peer-to-peer node network 201 may be implemented in a computing environment, such as computing environment 100 in FIG. 1. Permissioned distributed ledger peer-to-peer node network 201 is a system of hardware and software components for facilitating peer-to-peer cloud computational resource sharing. Permissioned distributed ledger peer-to-peer node network 201 is comprised of a plurality of opted-in nodes in a peer-to-peer relationship for securely sharing computational resources between permissioned peers in the network. The peers can be both providers and consumers of the shared computational resources.

In this example, permissioned distributed ledger peer-to-peer node network 201 includes primary provider 202, consumer 204, secondary provider 206, and permissioned distributed ledger 208. However, permissioned distributed ledger peer-to-peer node network 201 is intended as an example only and not as a limitation on illustrative embodiments. For example, permissioned distributed ledger peer-to-peer node network 201 can include any number of computational resource providers and consumers and other devices and components not shown.

Primary provider 202 may be, for example, computer 101 in FIG. 1 and represents a permissioned primary provider of computational resources to consumer 204. Consumer 204 may be, for example, EUD 103 in FIG. 1 and represents a permissioned user (i.e., permissioned consumer) of the computational resources provided by primary provider 202. Secondary provider 206 may be, for example, one of host physical machine set 142 in FIG. 1. In this example, node 210 represents primary provider 202, node 212 represents consumer 204, and node 214 represents secondary provider 206 in permissioned distributed ledger peer-to-peer node network 201.

In this example, consumer 204 sends request 216 to primary provider 202 for allocation of additional cloud computational resources 218 from a secondary provider of computational resources. Upon receiving request 216, primary provider 202 validates that consumer 204 is authorized to receive additional cloud computational resources 218 based on data contained in permissioned distributed ledger 208.

Permissioned distributed ledger 208 is designed with restrictions, such that only permissioned or authorized users have access to permissioned distributed ledger 208. In other words, permissioned distributed ledger 208 is not publicly accessible and is only accessible by users with appropriate permissions. In other words, permissioned users are known, authorized participants or members of permissioned distributed ledger peer-to-peer node network 201. A permissioned user may be, for example, an individual, enterprise, business, company, organization, institution, agency, or the like.

Permissioned distributed ledger 208 is suitable for users, who have a requirement of privileged information. Furthermore, permissioned distributed ledger 208 allows users to share sensitive information with security and confidentiality. Permissioned distributed ledger 208 depends on its participating users agreeing upon access control policies to maintain security and establish protocols to achieve higher transaction speeds.

Unlike centralized databases, all data in permissioned distributed ledger 208 is verifiable using secure cryptography and digitally-verifiable signatures or certificates. Permissioned distributed ledger 208 exists as a shared and continuously reconciled database. The distribution and reconciliation of permissioned distributed ledger 208 is performed automatically, by time, by some internal or extrinsic event, or by other criteria. In each case, permissioned distributed ledger 208 is a continuously growing chain of data blocks, which are linked and secured using cryptography. Each block contains a cryptographic hash of the previous block in permissioned distributed ledger 208, as well as a timestamp and data corresponding to an event, such as a transaction. The cryptographic hash of the previous block in permissioned distributed ledger 208, links the two blocks. The linked blocks form permissioned distributed ledger 208. Permissioned distributed ledger 208 appends blocks in chronological order. In other words, the last block in permissioned distributed ledger 208 is the most recent block. Further, blocks are immutable (i.e., cannot be changed or deleted). Each respective node, which represents a permissioned computational resource provider or consumer, connected to, or connecting to, permissioned distributed ledger peer-to-peer node network 201 receives a copy of permissioned distributed ledger 208, which is downloaded automatically.

In this example, permissioned distributed ledger 208 contains "block 0" 220, "block n−1" 222, and "block n" 224, which includes smart contract 226. However, it should be noted that permissioned distributed ledger 208 can contain any number of blocks. Smart contract 226 provides a mechanism to record and execute mutual agreements among individual permissioned users in permissioned distributed ledger peer-to-peer node network 201. Smart contract 226 is executable code that exists in permissioned distributed ledger 208 and inherits its properties, such as immutability. Smart contract 226 also is auto-executable, which means that once recorded, smart contract 226 can perform tasks without human intervention. In other words, smart contract 226 is computer programming instructions that digitally facilitate, verify, or enforce negotiation or performance of a digital contract.

In addition, each respective block, such as block n 224, includes a header, such as block n header 228. In this example, block n header 228 includes hash of block n−1 transactions 230 and Merkle root 232. Permissioned distributed ledger 208 generates Merkle root 232 by hashing together pairs of transaction identifiers (TXIDs), which provides a short and unique fingerprint for all transactions in block n−1 222. A TXID is an identification number for a transaction. A TXID is obtained by, for example, hashing transaction data through secure hash algorithm (SHA)-256 twice. Merkle root 232 is used as a field in block n header 228 of block n 224, which means that every block header will have a short representation of every transaction inside the block.

Primary provider 202 validates that consumer 204 is authorized to receive additional cloud computational resources 218 based, in part, on an analysis of smart contract 226. In response to validating that consumer 204 is authorized to receive additional cloud computational resources 218, primary provider 202 identifies an optimal secondary provider based on, for example, the additional computational resource needs of consumer 204, geographic distance of the secondary provider from consumer 204, and the like. In this example, primary provider 202 identifies secondary provider 206 as the optimal secondary provider to provide additional cloud computational resources 218 for consumer 204. Afterward, primary provider 202 performs a handoff operation to secondary provider 206.

Figure 3:
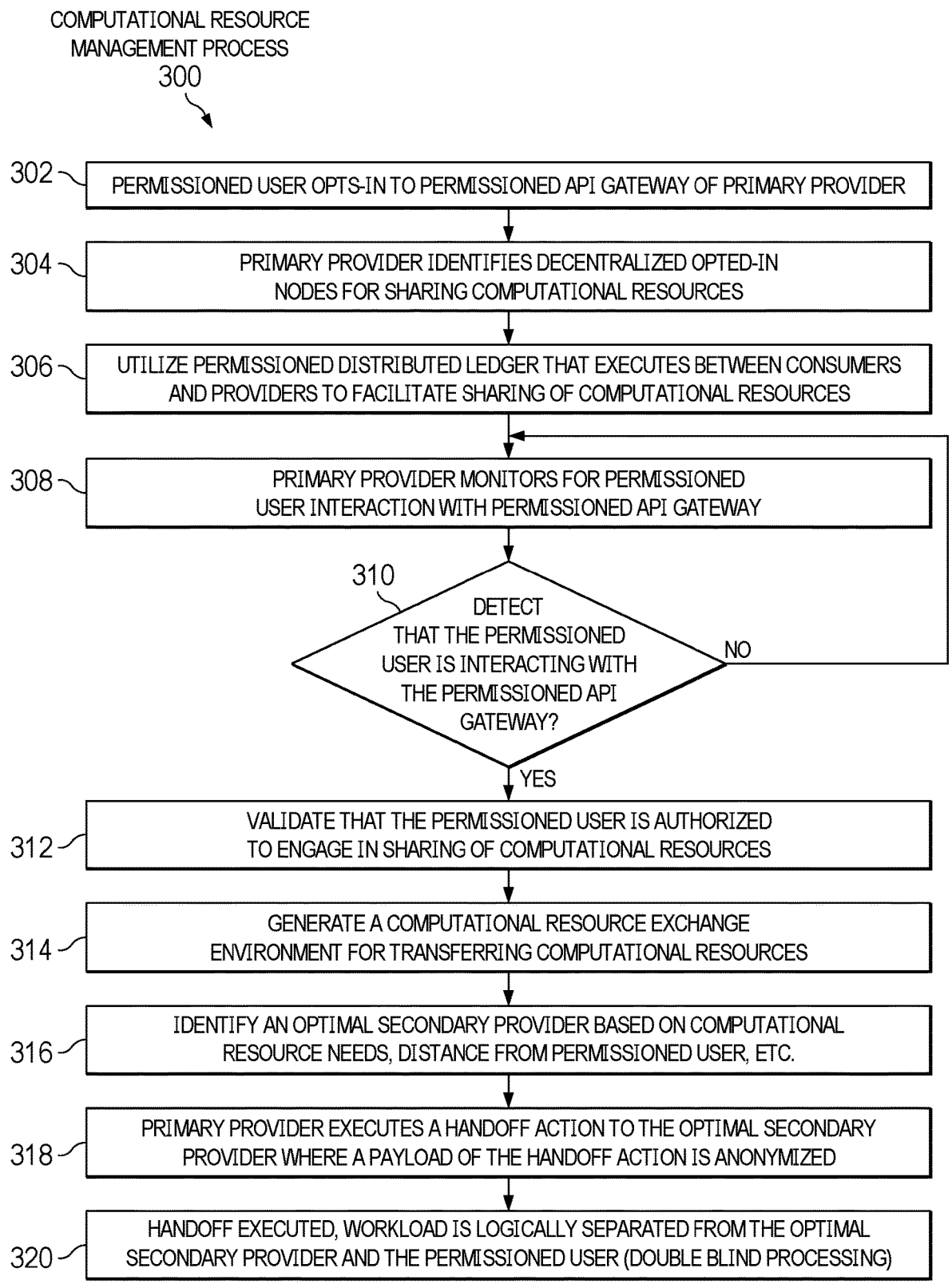
FIG. 3 is a diagram illustrating an example of a computational resource management process in accordance with an illustrative embodiment.

With reference now to FIG. 3, a diagram illustrating an example of a computational resource management process is depicted in accordance with an illustrative embodiment. Computational resource management process 300 can be implemented in a permissioned distributed ledger peer-to-peer node network, such as, for example, permissioned distributed ledger peer-to-peer node network 201 in FIG. 2.

In this example, computational resource management process 300 includes steps 302, 304, 306, 308, 310, 312, 314, 316, 318, and 320. However, it should be noted that computational resource management process 300 is intended as an example only and not as a limitation on illustrative embodiments. In other words, computational resource management process 300 can include any number of steps. For example, two or more steps can be combined, one step can be divided into two or more steps, one or more steps shown can be removed, or one or more steps not shown can be added.

At 302, a permissioned user opts-in to a permissioned API gateway of a primary provider of computational resources to the permissioned user (i.e., a computational resource consumer). The permissioned user and the primary provider may be, for example, consumer 204 and primary provider 202 in FIG. 2. The permissioned user opts-in to the permissioned API gateway to receive additional computational resources from a secondary provider of computational resources because, for example, the permissioned user underestimated the computational resource needs of a current activity workload.

At 304, the primary provider, using the permissioned API gateway, identifies decentralized opted-in nodes of the peer-to-peer network for sharing computational resources. At 306, the primary provider, using the permissioned API gateway, utilizes a permissioned distributed ledger that executes between consumers and providers to facilitate sharing of computational resources. The permissioned distributed ledger may be, for example, permissioned distributed ledger 208 in FIG. 2.

At 308, the primary provider monitors for interaction by the permissioned user with the permissioned API gateway. At 310, the primary provider detects whether the permissioned user is interacting with the permissioned API gateway based on the monitoring. If the primary provider does not detect that the permissioned user is interacting with the permissioned API gateway, then the primary provider continues to perform the monitoring at 308. If the primary provider does detect that the permissioned user is interacting with the permissioned API gateway, then, at 312, the primary provider validates that the permissioned user is authorized to engage in sharing of the computational resources. The primary provider validates that the permissioned user is authorized to engage in sharing of the computational resources using information contained in, for example, a smart contract of the permissioned distributed ledger. The smart contract may be, for example, smart contract 226 in FIG. 2.

At 314, in response to validating the permissioned user, the primary provider generates a computational resource exchange environment for transferring the additional computational resources to the permissioned user. The primary provider may generate the computational resource exchange environment by, for example, spinning up a virtual machine. At 316, the primary provider identifies an optimal secondary provider based on computational resource needs of the permissioned user, geographic distance from the permissioned user, and the like. The optimal secondary provider may be, for example, secondary provider 206 in FIG. 2.

At 318, in response to identifying an optimal secondary provider, the primary provider executes a handoff action to the optimal secondary provider where a payload of the handoff action is anonymized. The primary provider anonymizes the payload of the handoff action using, for example, at least one of software and network level obfuscation and secure routing provided by the permissioned distributed ledger. At 320, after the handoff is executed, the workload is logically separated from the optimal secondary provider and the permissioned user (i.e., double blind processing).

With reference now to FIG. 4, a flowchart illustrating a process for peer-to-peer computational resource sharing using a permissioned distributed ledger is shown in accordance with an illustrative embodiment. The process shown in FIG. 4 may be implemented in a computing environment, such as, for example, computing environment 100 in FIG. 1. For example, the process shown in FIG. 4 may be implemented in computational resource management code 200 in FIG. 1.

The process begins when one or more processors of the computing environment receive an indication that a permissioned computational resource consumer is opting-in to utilize a permissioned API gateway of a permissioned primary computational resource provider corresponding to a peer-to-peer decentralized network to receive additional computational resources to perform a current workload (step 402). The one or more processors detect a request by the permissioned computational resource consumer for additional computational resources from a permissioned secondary computational resource provider via the permissioned application programming interface gateway of the permissioned primary computational resource provider corresponding to the peer-to-peer decentralized network (step 404). The one or more processors validate that the permissioned computational resource consumer is authorized to consume the additional computational resources and that the permissioned secondary computational resource provider is authorized to transfer the additional computational resources to the permissioned computational resource consumer via the peer-to-peer decentralized network utilizing a permissioned distributed ledger (step 406).

The one or more processors generate a computational resource exchange environment to transfer the additional computational resources from the permissioned secondary computational resource provider to the permissioned computational resource consumer in response to the one or more processors validating that the permissioned computational resource consumer is authorized to consume the additional computational resources and that the permissioned secondary computational resource provider is authorized to transfer the additional computational resources to the permissioned computational resource consumer via the peer-to-peer decentralized network (step 408). Generating the computational resource exchange environment includes the one or more processors spinning up a virtual machine to transfer the additional computational resources to the permissioned computational resource consumer. It should be noted that the permissioned primary computational resource provider provisions the virtual machine. Alternatively, another permissioned computational resource provider of the peer-to-peer decentralized network provisions the virtual machine.

The one or more processors transfer the additional computational resources from the permissioned secondary computational resource provider to the permissioned computational resource consumer for consumption to perform the current workload via the generated computational resource exchange environment (step 410). The additional computational resources provided by the permissioned secondary computational resource provider and the consumption of the additional computational resources by the permissioned computational resource consumer are anonymized. Thereafter, the process terminates.

The additional computational resources provided by the permissioned secondary computational resource provider and the consumption of the additional computational resources by the permissioned computational resource consumer are anonymized based, at least in part, on software and network level obfuscation and secure routing. The secure routing is based on the permissioned distributed ledger where an offer of the additional computational resources by the computational resource provider is written globally but read and interacted with securely by a permissioned API gateway of the permissioned primary computational resource provider via the permissioned distributed ledger.

The permissioned distributed ledger facilitates availability of the computational resources for sharing between permissioned computational resource consumers and permissioned computational resource providers via the peer-to-peer decentralized network. The permissioned API gateway of the permissioned primary computational resource provider accesses the permissioned distributed ledger to securely validate the permissioned computational resource consumer and deliver the additional computational resources from the permissioned secondary computational resource provider to the permissioned computational resource consumer via the peer-to-peer decentralized network.

The permissioned secondary computational resource provider is a seller of the additional computational resources to the permissioned computational resource consumer. In addition, the permissioned secondary computational resource provider is a different permissioned computational resource consumer that previously purchased overallocated and unused computational resources from another permissioned computational resource provider and is now the seller of the additional computational resources to the permissioned computational resource consumer.

Thus, illustrative embodiments of the present invention provide a computer-implemented method, computer system, and computer program product for facilitating peer-to-peer cloud computing resource sharing utilizing a permissioned distributed ledger. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for peer-to-peer computational resource sharing using a permissioned distributed ledger, the computer-implemented method comprising:

detecting, by one or more processors, a request by a computational resource consumer for additional computational resources from a secondary computational resource provider via a peer-to-peer decentralized network using an API gateway of a primary computational resource provider, wherein the secondary computational resource provider is identified based on geographic distance between computational resource providers and the computational resource consumer;

generating, by the one or more processors, a computational resource exchange environment to transfer the additional computational resources from the secondary computational resource provider to the computational resource consumer in response to the one or more processors validating that the computational resource consumer is authorized to consume the additional computational resources and that the secondary computational resource provider is authorized to transfer the additional computational resources to the computational resource consumer via the peer-to-peer decentralized network; and transferring, by the one or more processors, the additional computational resources from the secondary computational resource provider to the computational resource consumer for consumption via the computational resource exchange environment, wherein the additional computational resources provided by the secondary computational resource provider and the consumption of the additional computational resources by the computational resource consumer are anonymized to separate workloads between the primary computational resource provider and the secondary computational resource provider.

2. The computer-implemented method of claim 1, wherein the additional computational resources provided by the secondary computational resource provider and the consumption of the additional computational resources by the computational resource consumer are anonymized based, at least in part, on software and network level obfuscation and secure routing, and wherein the secure routing is based on the permissioned distributed ledger where an offer of the additional computational resources by the secondary computational resource provider is written globally but read and interacted with securely by the permissioned application programming interface (API) gateway of the primary computational resource provider via the permissioned distributed ledger.

3. The computer-implemented method of claim 1, wherein the permissioned distributed ledger facilitates availability of computational resources for sharing between permissioned computational resource consumers and permissioned computational resource providers via the peer-to-peer decentralized network.

4. The computer-implemented method of claim 1, wherein the permissioned distributed ledger is accessed by a permissioned API gateway of the primary computational resource provider to securely validate the computational resource consumer and deliver the additional computational resources from the secondary computational resource provider to the computational resource consumer via the peer-to-peer decentralized network.

5. The computer-implemented method of claim 1, wherein the secondary computational resource provider is a seller of the additional computational resources to the computational resource consumer.

6. The computer-implemented method of claim 1, wherein the secondary computational resource provider is a different computational resource consumer that previously purchased overallocated and unused computational resources from another computational resource provider and is now a seller of the additional computational resources to the computational resource consumer.

7. The computer-implemented method of claim 1, wherein the generating of the computational resource exchange environment includes spinning up a virtual machine to transfer the additional computational resources to the computational resource consumer, and wherein another computational resource provider provisions the virtual machine.

8. A computer system for peer-to-peer computational resource sharing using a permissioned distributed ledger, the computer system comprising:
  a communication fabric;
  one or more storage devices connected to the communication fabric, wherein the one or more storage devices store program instructions; and
  one or more processors connected to the communication fabric, wherein the one or more processors execute the program instructions to:
    detect a request by a computational resource consumer for additional computational resources from a secondary computational resource provider via a peer-to-peer decentralized network using an API gateway of a primary computational resource provider, wherein the secondary computational resource provider is identified based on geographic distance between computational resource providers and the computational resource consumer;
    generate a computational resource exchange environment to transfer the additional computational resources from the secondary computational resource provider to the computational resource consumer in response to validating that the computational resource consumer is authorized to consume the additional computational resources and that the secondary computational resource provider is authorized to transfer the additional computational resources to the computational resource consumer via the peer-to-peer decentralized network; and
    transfer the additional computational resources from the secondary computational resource provider to the computational resource consumer for consumption via the computational resource exchange environment, wherein the additional computational resources provided by the secondary computational resource provider and the consumption of the additional computational resources by the computational resource consumer are anonymized to separate workloads between the primary computational resource provider and the secondary computational resource provider.

9. The computer system of claim 8, wherein the additional computational resources provided by the secondary computational resource provider and the consumption of the additional computational resources by the computational resource consumer are anonymized based, at least in part, on software and network level obfuscation and secure routing, and wherein the secure routing is based on the permissioned distributed ledger where an offer of the additional computational resources by the secondary computational resource provider is written globally but read and interacted with securely by the permissioned application programming interface (API) gateway of the primary computational resource provider via the permissioned distributed ledger.

10. The computer system of claim 8, wherein the permissioned distributed ledger facilitates availability of computational resources for sharing between permissioned computational resource consumers and permissioned computational resource providers via the peer-to-peer decentralized network.

11. The computer system of claim 8, wherein the permissioned distributed ledger is accessed by a permissioned API gateway of the primary computational resource provider to securely validate the computational resource consumer and deliver the additional computational resources from the secondary computational resource provider to the computational resource consumer via the peer-to-peer decentralized network.

12. The computer system of claim 8, wherein the secondary computational resource provider is a seller of the additional computational resources to the computational resource consumer.

13. The computer system of claim 8, wherein the secondary computational resource provider is a different computational resource consumer that previously purchased overallocated and unused computational resources from another computational resource provider and is now a seller of the additional computational resources to the computational resource consumer.

14. A computer program product for peer-to-peer computational resource sharing using a permissioned distributed ledger, the computer program product comprising a computer-readable storage medium having program instructions embodied therewith, the program instructions executable by one or more processors to cause the one or more processors to perform a method of:
  detecting, by the one or more processors, a request by a computational resource consumer for additional computational resources from a secondary computational resource provider via a peer-to-peer decentralized network using an API gateway of a primary computational resource provider, wherein the secondary computational resource provider is identified based on geographic distance between computational resource providers and the computational resource consumer;

generating, by the one or more processors, a computational resource exchange environment to transfer the additional computational resources from the secondary computational resource provider to the computational resource consumer in response to the one or more processors validating that the computational resource consumer is authorized to consume the additional computational resources and that the secondary computational resource provider is authorized to transfer the additional computational resources to the computational resource consumer via the peer-to-peer decentralized network; and transferring, by the one or more processors, the additional computational resources from the secondary computational resource provider to the computational resource consumer for consumption via the computational resource exchange environment, wherein the additional computational resources provided by the secondary computational resource provider and the consumption of the additional computational resources by the computational resource consumer are anonymized to separate workloads between the primary computational resource provider and the secondary computational resource provider.

15. The computer program product of claim 14, wherein the additional computational resources provided by the secondary computational resource provider and the consumption of the additional computational resources by the computational resource consumer are anonymized based, at least in part, on software and network level obfuscation and secure routing, and wherein the secure routing is based on the permissioned distributed ledger where an offer of the additional computational resources by the secondary computational resource provider is written globally but read and interacted with securely by the permissioned application programming interface (API) gateway of the primary computational resource provider via the permissioned distributed ledger.

16. The computer program product of claim 14, wherein the permissioned distributed ledger facilitates availability of computational resources for sharing between permissioned computational resource consumers and permissioned computational resource providers via the peer-to-peer decentralized network.

17. The computer program product of claim 14, wherein the permissioned distributed ledger is accessed by a permissioned API gateway of the primary computational resource provider to securely validate the computational resource consumer and deliver the additional computational resources from the secondary computational resource provider to the computational resource consumer via the peer-to-peer decentralized network.

18. The computer program product of claim 14, wherein the secondary computational resource provider is a seller of the additional computational resources to the computational resource consumer.

19. The computer program product of claim 14, wherein the secondary computational resource provider is a different computational resource consumer that previously purchased overallocated and unused computational resources from another computational resource provider and is now a seller of the additional computational resources to the computational resource consumer.

20. The computer program product of claim 14, wherein the generating of the computational resource exchange environment includes spinning up a virtual machine to transfer the additional computational resources to the computational resource consumer, and wherein another computational resource provider provisions the virtual machine.

* * * * *